United States Patent [19]

Westbrook

[11] Patent Number: 4,647,641
[45] Date of Patent: Mar. 3, 1987

[54] CURABLE ORGANOPOLYSILOXANE COMPOSITIONS

[75] Inventor: Solomon C. Westbrook, Erie, N.Y.

[73] Assignee: Pennwalt Corporation, Philadelphia, Pa.

[21] Appl. No.: 678,429

[22] Filed: Dec. 5, 1984

[51] Int. Cl.$^4$ ............................................. C08G 77/06
[52] U.S. Cl. ...................................... 528/24; 528/32; 528/43; 525/474
[58] Field of Search .......................... 528/24, 32, 43; 525/474

[56] References Cited

U.S. PATENT DOCUMENTS 4,051,310  9/1977  Lewis ................................. 528/24
4,526,922  7/1985  Pickwell et al. .................... 528/24

Primary Examiner—Melvyn I. Marquis

[57] ABSTRACT

Organopolysiloxane polymers are cured with bromobenzoyl peroxides of the structure:

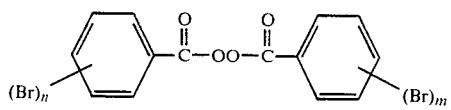

where n is 1 or 2 and m is 0, 1, or 2 in order to produce non-toxic, stable, cured polymers.

4 Claims, No Drawings

CURABLE ORGANOPOLYSILOXANE COMPOSITIONS

BACKGROUND OF THE INVENTION

This invention relates to silicone rubber curing compositions in which bromobenzoyl peroxides are used as improved curing catalysts.

Cured or vulcanized silicone elastomers have become valuable materials owing to the attractive low temperature ($-150°$ F.) and high temperature ($600°$ F.) physical properties, low compression set, physical strength, vibration damping ability, resistance to weathering, chemical resistance, biological inertness, fungus resistance, electrical properties, and release properties. Because of these attractive properties vulcanized silicone rubber parts and articles have found increasing use in high temperature under-the-hood automotive applications (e.g., insulation for ignition wiring, heater hoses, gaskets, "O" rings, rubber boots, etc.), aerospace applications (e.g., jet and rocket engine parts, ablative coatings, etc.), food and health applications (e.g., conveyor belts for handling of sticky foods, nipples for baby bottles, prosthetic devices, and surgical tubing), high voltage electrical applications (e.g., insulation for wires at power plants) and construction applications (e.g., glazes).

In order to fabricate such useful parts and articles processable silicone rubber compounds containing an organopolysiloxane gum, reinforcing filler(s), additives and a curing (vulcanizing) agent must be formed, molded, or extruded and subjected to elevated temperatures ($115°-175°$ C.) in order to shape and crosslink the silicone rubber composition. A post-cure and possibly also a heat aging are often needed to drive off decomposition products derived from the curing agent and other volatile materials that may be present. These treatments result in improved compression set and electrical properties and reduced odor and outgassing.

The most attractive curing agents for silicone rubber compounds are those that are very active and vulcanize at lower temperatures. Hence, energy requirements for curing are lower and cured silicone rubber parts or articles can be made faster and at lower unit costs. The most active peroxide curing agents are aromatic diacyl peroxides such as benzoyl peroxide (BPO) 1, di-(2,4-dichlorobenzoyl)peroxide 2, di-(2-chlorobenzoyl)peroxide 3, and di-(4-chlorobenzoyl)peroxide 4. Up to the present time the most active silicone rubber curing agents have been 2 and 3. 4 and BPO are the slowest of the active curing catalysts for silicone rubber compounds. Although these active curing catalysts are effective curing agents for silicone rubber compounds, there are some disadvantages to using them as curing agents for silicone rubbers. The use of 2 for curing of silicone rubber compounds results in vulcanized articles that exhibit undesirable blooming effects (British Pat. No. 1,595,534). In addition, it is generally known by peroxide producers, silicone rubber producers and fabricators, and the US EPA that chlorobenzoyl peroxides such as 2, 3, and 4 decompose thermally to form significant amounts of toxic polychlorinated biphenyls (PCB's) (Federal Register, Vol. 48, No. 237, 12/8/83, PP. 55076-98, EPA Proposed Rules, 40 CFR Part 761, Polychlorinated Biphenyls (PCB's); Exclusions, Exemptions and Use Authorizations). Hence, silicone rubber articles vulcanized with 2, 3 and 4 are likely to contain detectable amounts of PCB's such as 2,2′,4,4′-tetrachlorobiphenyl, 2,2′-dichlorobiphenyl and 4,4′-dichlorobiphenyl, respectively. This is highly undesirable, especially when the vulcanized articles are used in contact with food (such as food conveyor belts) or are used in prosthetic devices. The threat of PCB's not only affects the fabricators and end-users of silicone rubber articles but it also deleteriously affects the producers of chlorobenzoyl peroxides. If these chlorobenzoyl peroxides are handled significantly above their recommended storage temperatures, thermal decompositions could occur, thus exposing workers and the environment to toxic PCB's. When these incidents occur, costly cleanups and disposals and time consuming reporting to the US EPA and state and local agencies are required.

Thus, there is a need for an active silicone rubber curing catalyst which has activity similar to that of 2 and which does not decompose thermally to form undesirable and toxic PCB's. It has now have surprisingly and unexpectedly found that di-(2-bromobenzoyl)peroxide 5, a silicone rubber curing agent used in this invention, satisfies both of these criteria. Decomposition of this peroxide does not result in formation of toxic PCB's. Furthermore, 5 was found to be significantly more efficient in curing of a silicone rubber composition than was 2 when both were evaluated at equivalent levels in the silicone rubber composition.

SUMMARY OF THE INVENTION

The present invention is directed to a curable silicone rubber composition comprising 0.2 to 10 parts by weight of at lease one bromobenzoyl peroxide curing catalyst of the structure (I):

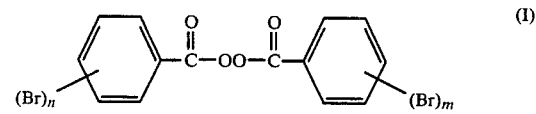

where
n is 1 or 2 and
m is 0, 1, or 2, and
90 to 99.8 parts by weight of an organopolysiloxane polymer having a major repeating unit

where
R and $R_1$ are independently selected from H, alkyl of 1 to 4 carbons, cycloalkyl of 6 to 9 carbons, and phenyl, and said polymer having optionally, randomly located structural units

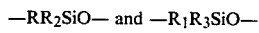

where
$R_2$ is phenyl and
$R_3$ is an alkenyl of 2 to 3 carbons,
whereby the degree of polymerization (i.e., the number of repeating monomer units per polymer chain) of the organopolysiloxane polymer being between about 700 and about 15,000.

DESCRIPTION OF INVENTION

The bromobenzoyl peroxide curing catalysts of structure I were prepared by procedures reported in the literature by W. Cooper in the Journal of the Chemical Society, 1951, pages 3106-3113, which is herein incorporated by references.

Examples of the bromobenzoyl peroxide curing catalysts that are useful in the composition of this invention are benzoyl 2-bromobenzoyl peroxide, benzoyl 4-bromobenzoyl peroxide, di-(2-bromobenzoyl)peroxide, di-(3-bromobenzoyl)peroxide, di-(4-bromobenzoyl)peroxide, and di-(2,4-dibromobenzoyl)peroxide.

The organopolysiloxane polymers employed in the compositions and in the curing processes of this invention are generally prepared by the process described in the 1978 edition of the Vanderbilt RUBBER Handbook on pages 216-232.

In general, one or more dichlorosilanes are hydrolyzed to the corresponding silanediols and/or siloxanes with silanol end groups. These intermediates are then converted to the organopolysiloxane by a condensation polymerization under controlled conditions. In addition, hydrolysis of the dichlorosilanes can result in formation of cyclic siloxanes. These cyclic siloxanes can be converted to organopolysiloxane polymers under basic conditions. Dichlorosilanes that can be used in the above processes for preparing organopolysiloxanes are methyldichlorosilane, dimethyldichlorosilane, diethyldichlorosilane, methylphenyldichlorosilane, ethylphenyldichlorosilane, diphenyldichlorosilane, methylvinyldichlorosilane, phenylvinyldichlorosilane, allylmethyldichlorosilane, and cyclohexylmethyldichlorosilane.

Typical organopolysiloxane polymers of this invention are polydimethylsiloxane, polydiethylsiloxane, poly(dimethylsiloxane-co-methylphenylsiloxane), poly(dimethylsiloxane-co-methylvinylsiloxane), poly(methylsiloxane-co-dimethylsiloxane), poly(methylsiloxane-co-methylvinylsiloxane), Poly(dimethylsiloxane-co-diphenylsiloxane), Poly(dimethylsiloxane-co-phenylvinylsiloxane), poly(dimethylsiloxane co-allylmethylsiloxane), poly(dimethylsiloxane-co-cyclohexylmethylsiloxane), poly(dimethylsiloxane-co-methylvinylsiloxane-co-methylphenylsiloxane), and mixtures of these organopolysiloxanes.

The temperature used to crosslink (cure) the organopolysiloxane is not critical, but should be less than the decomposition temperature of the siloxane, for obvious reasons. Also, the temperature used should be sufficient so that at least partial crosslinking of the siloxane occurs. Of course, it is usually preferable to substantially completely crosslink the siloxane. Typical crosslinking temperatures are usually in the range of from about 70° C. to about 150° C., more preferably in the range of from about 90° C. to about 130° C.

The crosslinking may also occur under the influence of pressure, although it is not necessary for pressure to be used. If the crosslinking is effected under pressure, the normal pressures used are the high pressures associated with molding/processing conditions. The pressures may be in the range of from about 14.7 psia to about 1000 psia or higher depending on the operation conditions.

The organopolysiloxane polymer compositions of this invention can optionally contain reinforcing fillers such as very fine fumed silica, ground quartz, calcium carbonate, metal oxides, metals (e.g., flake or powdered silver), etc., processing aids such as low molecular weight silicone fluids, inorganic colorants and pigments such as red iron oxide, non-halogenated flame retardants, blowing agents, and stabilizers.

EXAMPLES

Curing/Crosslinking of Silicone Rubber With Bromobenzoyl Peroxides

Three bromobenzoyl peroxide A curing catalysts of this invention, di-(2-bromobenzoyl)peroxide (I-1), benzoyl 2-bromobenzoyl peroxide (I-2) and di-(4-bromobenzoyl)peroxide (I-3), were evaluated as curing/crosslinking agents for a silicone rubber and were compared as curing/crosslinking agents to di-(2-chlorobenzoyl)peroxide (A-1) and di-(2,4-dichlorobenzoyl)peroxide (A-2) at equivalent levels. Peroxides A-1 and A-2 are silicone rubber curing catalysts of the prior art that are used commercially to cure silicone rubber articles. The silicone rubber used in this example was a silicone rubber gum produced by General Electric Company (SE-435). The organopolysiloxane polymer in SE-435 was a poly(dimethylsiloxane-co-methylvinylsiloxane).

The curable silicone rubber compositions of this example were prepared by the following procedure. The SE-435 silicone rubber gum (100 g) was fluxed in a C. W. Brabender Plasti-Corder with roller-5 type blades. The blade tip speed was 50 rpm and the mixing head temperature was 25° C. The curing/crosslinking agent (0.01 mole) was then added to the fluxed resin and the composition was allowed to mix for three minutes. The sample of compounded silicone rubber was then removed from the mixing head and was quickly pressed into plaques utilizing a Carver Laboratory Press (Model C) at room temperature.

Curing/crosslinking evaluations on the plaques were carried out using a Monsanto Oscillating Disk Rheometer (ODR) (Model R-100). The ODR test procedure consisted of enclosing the uncured plaque (under positive pressure) in a heated die cavity containing a biconical disk. The disk was ocillated at 100 Hz/min. through an arc of 3°. The force or torque required to oscillate the disk was recorded as a function of time. The shear modulus is proportional to the extent of crosslinking and is a representation of the cure reaction. The shear modulus increases as percent of crosslinking increases. The responses or recorded data from the ODR tests were as follows:

TABLE

Silicone Rubber Curing - ODR Results
(100 Hz/min, 3° arc)

| Curing Agent | Level* ghgr | Temp, °C. | Torque, in-lbs | | | TC90** mins | TS2*** mins |
|---|---|---|---|---|---|---|---|
| | | | MH[1] | ML[2] | MH − ML[3] | | |
| I-1 | 4.0 | 100 | 65 | 10 | 55 | 9.5 | 1.3 |
| I-1 | 4.0 | 107.2 | 62 | 7 | 55 | 4.3 | 0.8 |
| I-2 | 3.2 | 100 | 54 | 4 | 50 | 9.2 | 1.1 |
| I-3 | 4.0 | 100 | 32 | 4 | 28 | >120 | 20.0 |
| I-3 | 4.0 | 107.2 | 48 | 4 | 44 | 51.2 | 7.2 |
| I-3 | 4.0 | 121 | 56 | 4 | 52 | 17.9 | 2.0 |
| A-1 | 3.1 | 100 | 44 | 7 | 37 | 5.5 | 1.1 |
| A-2 | 3.8 | 100 | 45 | 5 | 40 | 6.3 | 1.1 |
| A-2 | 3.8 | 107.2 | 47 | 5 | 42 | 4.3 | 0.8 |

*All curing agents were tested at the same level (0.01 mole per 100 g of resin).
ghgr - grams per hundred grams of resin.
**TC90 - Time (in minutes) to reach 90% of maximum torque, a measure of cure time.
***TS2 - Scorch time in minutes - the time for the torque to increase 2 in-lbs above ML.
[1]MH - Maximum torque in in-lbs, a measure of crosslinking attained.
[2]ML - Minimum torque in in-lbs, a measure of viscosity of the uncured resin. It can be an indicator of scorch, especially if ML is relatively high.
[3]MH − ML Difference in torque in in-lbs which can be a direct measure of the extent of crosslinking.

This table summarizes ODR data obtained for I-1, I-2, I-3, A-1, and A-2. The results unexpectedly and surprisingly show that under optimum curing conditions resins cured with I-1, I-2, and I-3, the silicone rubber curing/crosslinking agents of this invention, attain significantly higher levels of curing/crosslinking (as judged by the difference in torque, MH-ML) than do resins cured with the curing/crosslinking agents of the art, A-1 and A-2. In the case of I-1 the curing/crosslinking efficiency was at least 30% greater than that when A-2 was used as the curing/crosslinking agent. Hence, if I-1 were used in place of A-2 silicone rubber articles could be cured more completely and/or more rapidly, thus, reducing unit costs of the cured silicone rubber articles.

As previously mentioned the art chlorobenzoyl peroxides, e.g., A-1 and A-2, are known to decompose to form measurable amounts of toxic PCB's. On the other hand the bromobenzoyl peroxides I of this invention (e.g., I-1, I-2 and I-3) do not decompose to toxic PCB's. This is another advantage for using the bromobenzoyl peroxides I curing/crosslinking agents of this invention over the chlorobenzoyl peroxide curing/crosslinking agents of the prior art.

What is claimed:

1. A curable silicone rubber composition comprising 0.2 to 10 parts by weight of at least one bromobenzoyl peroxide curing catalyst of structure

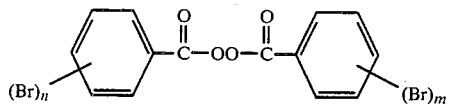

where
n is 1 or 2 and
m is 0, 1, or 2, and
90 to 99.8 parts by weight of an organopolysiloxane polymer having a major repeating unit —RR$_1$SiO— where
R and R$_1$ are independently selected from H, alkyl of 1 to 4 carbons, cycloalkyl of 6 to 9 carbons, and phenyl, and said polymer having optionally, randomly located structural units —RR$_2$SiO— and —R$_1$R$_3$SiO— where
R$_2$ is phenyl and
R$_3$ is an alkenyl of 2 to 3 carbons,
whereby the degree of polymerization of the organopolysiloxane polymer being between about 700 and about 15,000.

2. The composition of claim 1 where the curing catalyst is selected from di-(2-bromobenzoyl)peroxide, benzoyl 2-bromobenzoyl peroxide, di-(4-bromobenzoyl)peroxide, benzoyl 4-bromobenzoyl peroxide, di-(3-bromobenzoyl)peroxide, and di-(2,4-dibromobenzoyl)peroxide.

3. A process of curing the curable silicone rubber composition of claim 1 comprising heating said composition at a temperature of 70° to 150° C. until curing is effected.

4. The process of claim 3 wherein the curing catalyst is selected from di-(2-bromobenzoyl)peroxide, benzoyl 2-bromobenzoyl peroxide, di-(4-bromobenzoyl)peroxide, benzoyl 4-bromobenzoyl peroxide, di-(3-bromobenzoyl)peroxide, and di-(2,4-dibromobenzoyl)peroxide.

* * * * *